United States Patent
Xia et al.

(10) Patent No.: US 7,801,145 B2
(45) Date of Patent: Sep. 21, 2010

(54) METHOD FOR TRANSMITTING NETWORK PACKETS

(75) Inventors: Xu-Dong Xia, Tianjin (CN); Yih Yung, Taipei (TW)

(73) Assignee: Xtera Communications Taiwan Co. Ltd., Taipei (TW)

(*) Notice: Subject to any disclaimer, the term of this patent is extended or adjusted under 35 U.S.C. 154(b) by 432 days.

(21) Appl. No.: 11/775,594

(22) Filed: Jul. 10, 2007

(65) Prior Publication Data

US 2008/0219267 A1 Sep. 11, 2008

(30) Foreign Application Priority Data

Mar. 6, 2007 (TW) .............................. 96107623 A

(51) Int. Cl.
*H04L 12/56* (2006.01)
(52) U.S. Cl. ..................................... 370/394
(58) Field of Classification Search ................. 370/469, 370/276, 349, 539
See application file for complete search history.

(56) References Cited

U.S. PATENT DOCUMENTS

| | | | | |
|---|---|---|---|---|
| 6,351,469 B1 * | 2/2002 | Otani et al. .................. 370/459 |
| 6,882,637 B1 * | 4/2005 | Le et al. ...................... 370/349 |
| 7,406,082 B2 * | 7/2008 | Nagarajan et al. ........... 370/394 |
| 7,450,587 B2 * | 11/2008 | Gruhn et al. ................. 370/394 |
| 7,620,076 B2 * | 11/2009 | Alapuranen .................. 370/523 |
| 2003/0053440 A1 * | 3/2003 | Gruhn et al. ................. 370/349 |
| 2004/0042491 A1 * | 3/2004 | Sarkkinen et al. ........... 370/469 |
| 2006/0045017 A1 * | 3/2006 | Yamasaki .................... 370/236 |
| 2006/0140226 A1 * | 6/2006 | Ho et al. ...................... 370/539 |
| 2008/0089250 A1 * | 4/2008 | Jung .......................... 370/276 |
| 2010/0014520 A1 * | 1/2010 | Matsumoto et al. ......... 370/390 |

* cited by examiner

*Primary Examiner*—Thong H Vu
(74) *Attorney, Agent, or Firm*—Workman Nydegger

(57) ABSTRACT

A method for transmitting network packets is provided. Reordered network packets received by a receiving end are put into a buffer queue. When a waiting time expires or when a network packet with a sequence number equal to the current transmission sequence number is received, the receiving end picks and transmits appropriate network packets from the buffer queue. Therefore, reordered network packets are sorted and then sent out sequentially, thereby avoiding waste of network bandwidth caused by retransmitting network packets, and improving the transmitting efficiency of the network.

15 Claims, 5 Drawing Sheets

METHOD FOR TRANSMITTING NETWORK PACKETS

CROSS-REFERENCE TO RELATED APPLICATION

This application claims the priority benefit of Taiwan application serial no. 96107623, filed on Mar. 6, 2007. All disclosure of the Taiwan application is incorporated herein by reference.

BACKGROUND OF THE INVENTION

1. Field of the Invention

The present invention relates to a method for transmitting network packets. More particularly, the present invention relates to a method for transmitting network packets according to an order of packet sequence numbers.

2. Description of Related Art

With the progress of Internet, in order meet various usage requirements, network technology has been developed rapidly. Under a network environment of supporting tunnel routing technique, connections over Wide Area Network (WAN) form a tunnel group consisting of a plurality of tunnels. Network packets are distributed to each tunnel according to a certain strategy and then sent to the other side. The tunnel routing technique is advantageous in that if one of WAN links fails, network packets can still be transmitted through other tunnels, thus keeping a continuous network transmission. In addition, the method of using a plurality of tunnels to transmit network packets can further enhance network transmission rate. Therefore, the tunnel transmission technique meets the requirements for continuously transmitting data at a high speed.

However, since each tunnel in the tunnel group has a different network status, when a receiving end receives the network packets, network packets may be reordered. For example, if the transmitting end transmits packets with sequence numbers of 1-4 sequentially, the packet with the sequence number of 2 is delayed due to network congestion, such that the receiving end receives the packets with sequence numbers of 1, 3, 4 sequentially. When receiving the packet with sequence number of 1, the receiving end sends out an acknowledgment directed to the packet with sequence number of 1 to the transmitting end. Later, when receiving the packets with sequence numbers of 3, 4, the receiving end also sends out an acknowledgement directed to the packet with sequence number of 1. After receiving the acknowledgement directed to packet with sequence number of 1 three times successively, the transmitting end determines that the packet with sequence number of 2 is lost, and retransmits the packet with sequence number of 2. However, actually, the packet with sequence number of 2 is not lost during transmission. The unnecessary retransmission occupies network resources, and reduces the network transmission efficiency.

Furthermore, for some streaming application services emphasize the order of the network packets, if the network packets cannot be received in sequence, the service quality is greatly negatively influenced.

SUMMARY OF THE INVENTION

Accordingly, the present invention provides a method for transmitting network packets, in which reordered network packets are added to a buffer queue and sorted, such that the network packets can be transmitted according to the order of the packet sequence numbers.

The present invention provides a method for transmitting network packets suitable for a tunnel group having a plurality of tunnels. First, a receiving end which stores a transmission sequence number and accesses a buffer queue is provided. Next, the receiving end receives a current network packet, and compares a packet sequence number of the current network packet with the transmission sequence number. If the packet sequence number is larger than the transmission sequence number, the current network packet is added to the buffer queue, and a waiting time is correspondingly counted down. If the packet sequence number is equal to the transmission sequence number, the current network packet is transmitted, and the network packets in the buffer queue with sequence numbers continuous with the current network packet are also transmitted. If the packet sequence number is smaller than the transmission sequence number, the method determines whether or not to transmit the current network packet according to the requirement of the receiving end. When the waiting time is counted down to 0, the network packets in the buffer queue with continuous sequence numbers are transmitted, starting from the one with the minimum sequence number in the buffer queue.

According to a preferred embodiment of the present invention, the method for transmitting network packets further includes whenever a network packet in the buffer queue is transmitted, updating the transmission sequence number to be the sequence number of the last transmitted packet plus 1.

According to a preferred embodiment of the present invention, the method for transmitting network packets further includes whenever a network packet in the buffer queue is transmitted, if the buffer queue is empty, clearing the waiting time.

According to a preferred embodiment of the present invention, the method for transmitting network packets further includes whenever a network packet in the buffer queue is transmitted, if the buffer queue is not empty, restarting the countdown of the waiting time.

According to a preferred embodiment of the present invention, the method for transmitting network packets further includes whenever a network packet in the buffer queue is transmitted, if the buffer queue is not empty, calculating a countdown duration, and starting to count down the countdown duration.

According to a preferred embodiment of the present invention, the step of "calculating the countdown duration" includes taking the sum of the time when the first network packet is added to the buffer queue and the waiting time when the first network packet is added as a transmitting time, and taking the difference between the transmitting time and the current time as the countdown duration.

According to a preferred embodiment of the present invention, the step of "if the packet sequence number is smaller than the transmission sequence number, the method determines whether or not to transmit the network packet according to the requirement of the receiving end" includes if the receiving end does not require strictly-ordered transmission, transmitting the network packet, and if the receiving end requires strictly-ordered transmission, dropping the network packet.

According to a preferred embodiment of the present invention, the method for transmitting network packets further includes first calculating a delay time $Lat_i$ of each tunnel according to the time difference for the network packet to be transmitted from a transmitting end to a receiving end via each tunnel respectively, where the positive integer i is the tunnel number corresponding to the delay time. Next, a delay time variation $Var_i$ of each tunnel is calculated according to a difference between the delay time and the previously-calculated delay time of each tunnel. Then, the waiting time is calculated according to the delay time and the delay time variation.

According to a preferred embodiment of the present invention, the time difference is a relative time difference or an absolute time difference. The step of "calculating the delay time of the tunnel according to the time difference for the network packet to be transmitted from the transmitting end to the receiving end via the tunnel" includes first calculating the delay time $Lat_i = (Lat_{i\_old}*N+Delta\_t_i)/(N+1)$, wherein $Lat_{i\_old}$ is the previously-calculated delay time of the tunnel, $Delta\_t_i$ is the time difference mentioned above, and N is an integer greater than 0.

According to a preferred embodiment of the present invention, the step of "calculating the delay time variation of the tunnel according to the difference between the delay time and the previously-calculated delay time of the tunnel" includes first calculating the delay time variation $Var_i=(Var_{i\_old}*M+|Delta\_t_i-Lat_{i\_old}|)/(M+1)$, where $Var_{i\_old}$ is the previously-calculated delay time variation of the tunnel, $Delta\_t_i$ is the time difference mentioned above, $Lat_{i\_old}$ is the previously-calculated delay time of the tunnel, and M is an integer greater than 0.

According to a preferred embodiment of the present invention, the step of "if the packet sequence number is larger than the transmission sequence number, adding the current network packet to the buffer queue and correspondingly counting down the waiting time" further includes if the buffer queue is empty before the current network packet is added, starting to count down the waiting time.

According to a preferred embodiment of the present invention, the step of "calculating the waiting time according to the delay time and the delay time variation" further includes calculating a maximum value of the delay time $Lat_{max}=MAX(Lat_1,Lat_2,\ldots,Lat_k)$, where k is a maximum tunnel number, calculating a maximum value of the delay time variation $Var_{max}=MAX(Var_1,Var_2,\ldots,Var_k)$, calculating a maximum difference of the delay times $Lat\_Diff_{max}=MAX((Lat_{max}-Lat_1),(Lat_{max}-Lat_2),\ldots,(Lat_{max}-Lat_k))$, and calculating the waiting time$=Lat\_Diff_{max}+Var_{max}$.

According to a preferred embodiment of the present invention, the waiting time includes a tunnel waiting time $Tun\_wtime_i$ of each tunnel. The step of "if the packet sequence number is larger than the transmission sequence number, adding the current network packet to the buffer queue and correspondingly counting down the waiting time" further includes when the current network packet is added, starting to count down the tunnel waiting time of the tunnel transmitting the network packet.

According to a preferred embodiment of the present invention, the step of "calculating the tunnel waiting time" further includes calculating the maximum value of the delay time $Lat_{max}=MAX(Lat_1,Lat_2,\ldots,Lat_k)$, where k is a maximum tunnel number, calculating a maximum value of the delay time variation $Var_{max}=MAX(Var_1,Var_2,\ldots,Var_k)$, and finally calculating the tunnel waiting time $Tun\_wtime_i=(Lat_{max}-Lat_i)+Var_{max}$.

According to a preferred embodiment of the present invention, the step of "transmitting network packets in the buffer queue with continuous packet sequence numbers starting from the network packet with the minimum packet sequence number" further includes sequentially transmitting network packets from the one with the minimum packet sequence number in the buffer queue to the network packet whose tunnel waiting time is counted down to 0, and all network packets having packet sequence numbers continuous with the network packet whose the tunnel waiting time is counted down to 0.

In the present invention, reordered network packets sent to the receiving end are put into the buffer queue. When a waiting time expires or a network packet with a sequence number equal to the current transmission sequence number is received, the receiving end picks and transmits appropriate network packet from the buffer queue. Therefore, the reordered network packets are sorted and then sent out sequentially, thereby avoiding waste of network bandwidth caused by retransmitting network packets, and improving transmitting efficiency of the network.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Generally speaking, the streaming application service has strict requirements for the order of network packets. If the network packets can be transmitted sequentially, the network packets will not be retransmitted, thus saving network resources, and further the application service can be executed more smoothly. Based on the above reasons, the present invention provides a method for transmitting network packets. In order to make the content of the present invention more apparent, several embodiments are described below for illustrating the implementation of the present invention.

Figure 1:
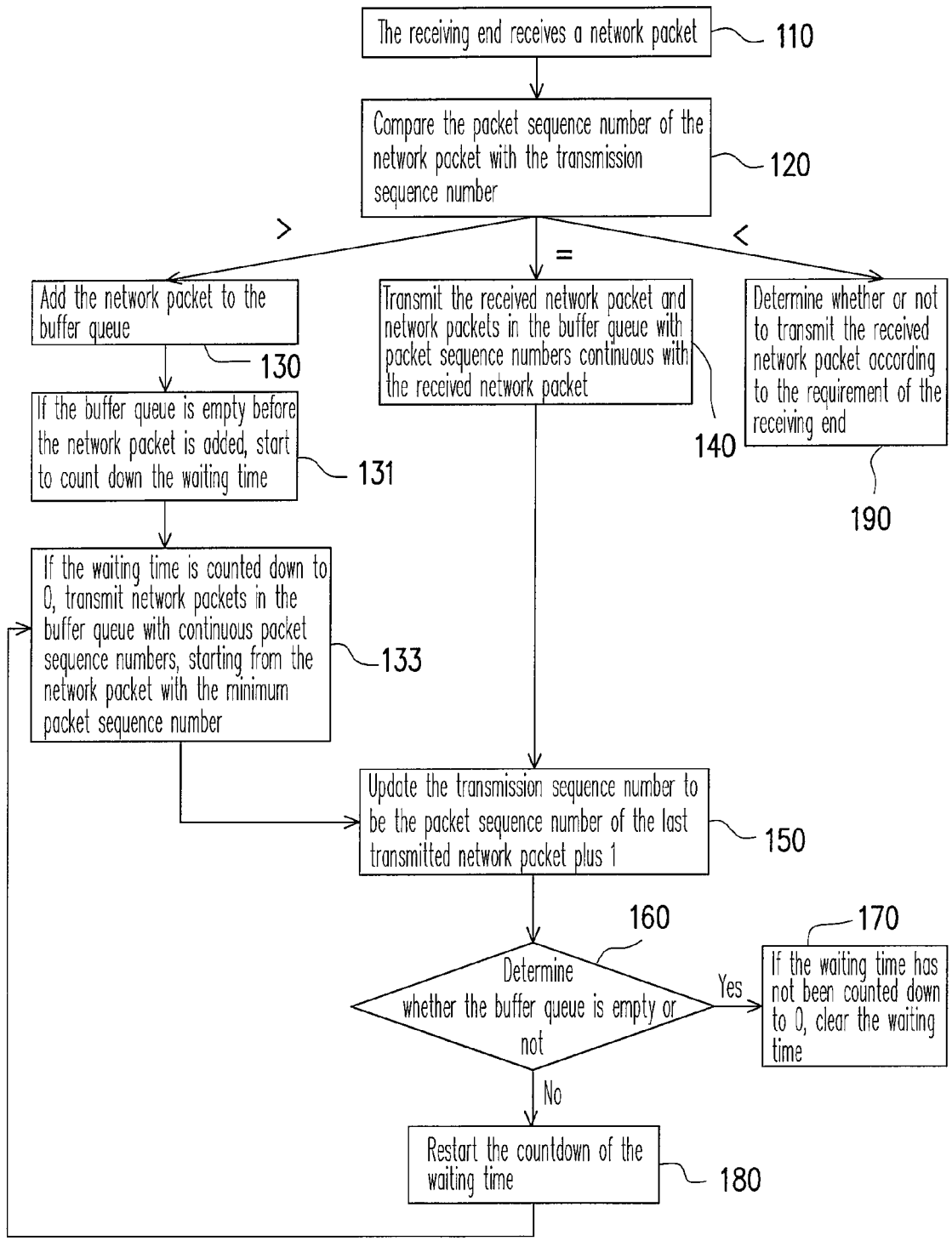
FIG. 1 is a flow chart of a method for transmitting network packets according to a preferred embodiment of the present invention.

FIG. 1 is a flow chart of a method for transmitting network packets according to a preferred embodiment of the present invention. In this embodiment, the receiving end for receiving the network packet stores a transmission sequence number, indicating the packet sequence number of the network packet to be transmitted currently. The receiving end can store the received network packet in the buffer queue, or retrieve the network packet from the buffer queue and then transmit the network packet. In order to avoid that the network packet stays in the buffer queue for a long time, the receiving end calculates one waiting time. When the waiting time is counted down to 0, appropriate network packets are taken out from the buffer queue and transmitted.

Referring to FIG. 1, in Step 110, the receiving end receives a network packet transmitted from a tunnel in a tunnel group. Next, as shown in Step 120, the receiving end compares the packet sequence number of the network packet with the transmission sequence number.

If the packet sequence number of the network packet is larger than the transmission sequence number, as shown in Step 130, the receiving end adds the network packet to the buffer queue. It should be noted that in this embodiment, if the buffer queue change from empty to non-empty, the waiting time starts to be counted down, and all the network packets added to the buffer queue are corresponding to the same countdown of the same waiting time. Therefore, as shown in Step 131, when the network packet is added to the buffer queue, the receiving end determines whether the buffer queue is empty or not before the network packet is added. If the buffer queue is empty before the network packet is added, the waiting time starts to be counted down. Otherwise, if other network packets are already added to the buffer queue, it indicates that the waiting time is being counted down.

In the context of this patent application, a computer system that receives network packets from another computer system in a computer network will be referred to as a "receiving end computer system" or simply as a "receiving end." Similarly, a computer system that transmits network packets to another computer system in a computer network will be referred to as a "transmitting end computer system" or a simply as a "transmitting end."

Figure 2:
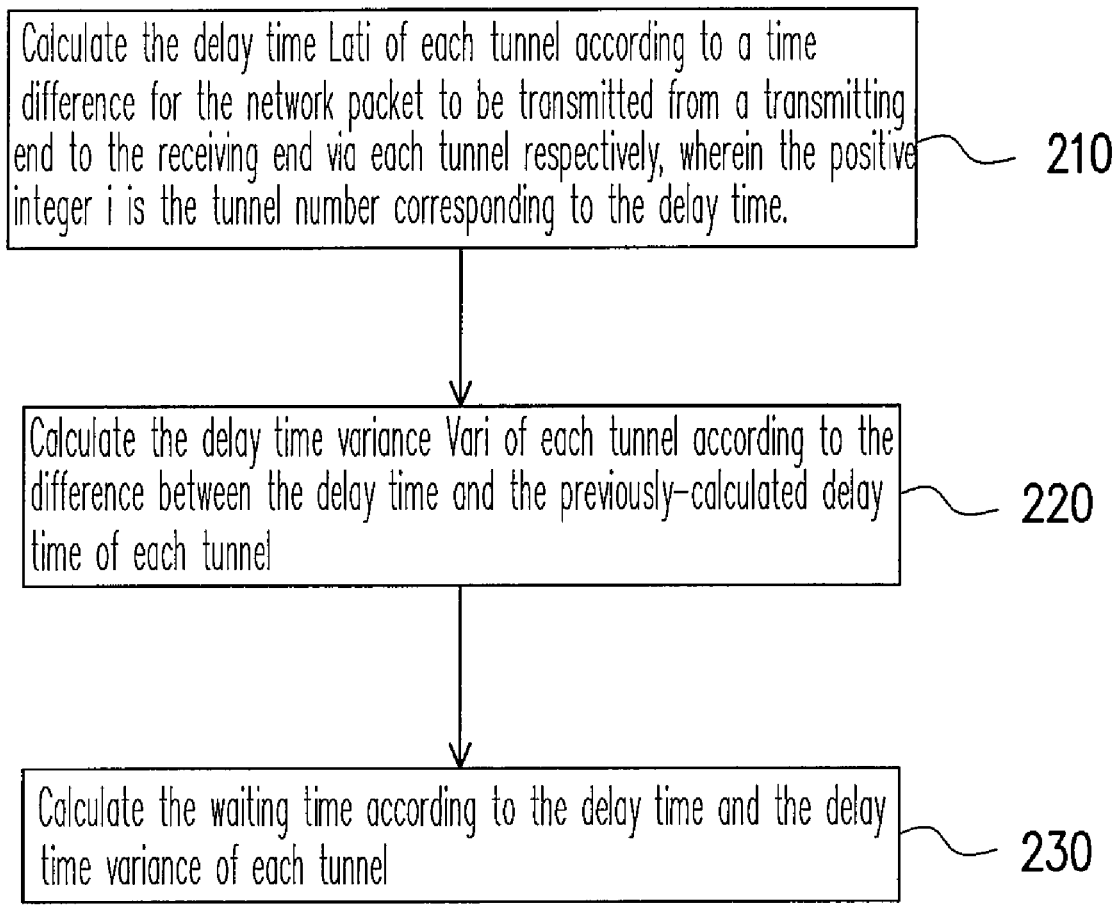
FIG. 2 is a flow chart of a method for calculating a waiting time according to a preferred embodiment of the present invention.

FIG. 2 is a flow chart of a method for calculating the waiting time according to a preferred embodiment of the present invention. Since each tunnel has a different network status, the delay time and the delay time variation for each tunnel in the tunnel group must be calculated first when calculating the waiting time. The time point at which the receiving end calculates the waiting time can be, for example, the time point whenever the receiving end receives the network packet, or the receiving end periodically calculates the waiting time, which is not limited herein.

Referring to FIG. 2, in Step 210, the delay time $Lat_i$ of each tunnel is calculated, according to a time difference for the network packet to be transmitted from a transmitting end to the receiving end via each tunnel respectively, where the positive integer i is the tunnel number corresponding to the delay time. The time difference can be obtained by adding a time stamp in the network packet with the transmitting end. When the receiving end receives the network packet, the time recorded in the time stamp is subtracted from the current time, so as to obtain the time difference for the tunnel. It should be mentioned that if the transmitting end and the receiving end have a synchronous system time, the time difference is an absolute time difference, i.e., the system time difference between the receiving end and the transmitting end. Otherwise, if the system time of the transmitting end and the system time of the receiving end are not synchronous, a relative time difference is calculated based on the actual uptime of the receiving end and the transmitting end. Here the actual uptime is the time elapsed since the receiving end or the transmitting end is booted. The uptime difference will be eliminated in the subsequent formulas, and will not influence the result. After obtaining the time difference, the delay time $Lat_i$ of each tunnel is calculated through the following formula in this embodiment:

$$Lat_i = (Lat_i\_old * N + Delta\_t_i)/(N+1),$$

where $Lat_i\_old$ is the previously-calculated delay time of the tunnel, $Delta\_t_i$ is the time difference of the tunnel, and N is a positive integer.

Then, as shown in Step 220, the delay time variation $Var_i$ of each tunnel is calculated according to the difference between the delay time and the previously-calculated delay time of each tunnel. The delay time variation $Var_i$ of each tunnel is calculated for each tunnel through the following formula in this embodiment:

$$Var_i = (Var_i\_old * M + |Delta\_t_i - Lat_i\_old|)/(M+1),$$

where $Var_i\_old$ is the previously-calculated delay time variation of the tunnel, $Delta\_t_i$ is the time difference of the tunnel, $Lat_i\_old$ is the previously-calculated delay time of the tunnel, and M is a positive integer.

Finally, in Step 230, the waiting time is calculated according to the delay time and the delay time variation of each tunnel. In this embodiment, first, a maximum value of the delay time $Lat_{max} = MAX(Lat_1, Lat_2, \ldots, Lat_k)$ must be calculated, where k is a maximum tunnel number. Next, a maximum value of all the delay time variations $Var_{max} = MAX(Var_1, Var_2, \ldots, Var_k)$ is calculated, and a maximum difference between all the delay times $Lat\_Diff_{max} = MAX((Lat_{max} - Lat_1), (Lat_{max} - Lat_2), \ldots, (Lat_{max} - Lat_k))$ is calculated. Finally, the waiting time is made to be equal to the sum of $Lat\_Diff_{max}$ and $Var_{max}$.

Referring back to FIG. 1, in Step 133, when the waiting time is continuously counted down to 0, the receiving end transmits network packets with continuous packet sequence numbers, starting from the network packet with the minimum packet sequence number in the buffer queue. For example, if there are four network packets with the packet sequence numbers of 13, 14, 15, 17 respectively in the buffer queue when the waiting time is counted down to 0, in Step 133, three network packets with the packet sequence numbers of 13, 14, 15 are transmitted together.

After the network packet has been transmitted, as shown in Step 150, the receiving end adds 1 to the packet sequence number of the last transmitted network packet to generate a new transmit sequence number. Subsequently, the receiving end takes 16 (i.e., 15+1) as a new transmission sequence number. As shown in Step 160, it is determined whether the buffer queue has been cleared or not. If the buffer queue does not have any network packet, as shown in Step 170, if the waiting time is not counted down to 0, the waiting time is cleared. If the buffer queue still has network packets, as shown in Step 180, the receiving end restarts the countdown of the waiting time, and the waiting time can be recalculated according to the above formula. When the waiting time is counted down to 0 again, the steps subsequent to Step 133 are carried out.

Return to Step 120. If the packet sequence number of the network packet received by the receiving end is equal to the transmission sequence number, in Step 140, the receiving end transmits the received network packet and all network packets in the buffer queue with packet sequence numbers continuous with the received network packet. For example, if the transmission sequence number stored in the receiving end is 12, and there are four network packets with the packet sequence numbers of 13, 14, 15, 17 respectively in the buffer queue, when receiving the network packet with the packet sequence number of 12, the receiving end transmits the network packets with the packet sequence numbers of 12, 13, 14, 15.

Similarly, after the network packet is transmitted, as shown in Step 150, the receiving end updates the transmission sequence number to be the packet sequence number of the last transmitted network packet plus 1. Then, in Step 160, it is determined whether the buffer queue is empty or not. If the buffer queue does not have any other network packet, and the waiting time is not counted down to 0, in Step 170, the waiting time is cleared. If the buffer queue still has network packets that have not been transmitted, as shown in Step 180, the countdown of the waiting time is restarted. After the waiting time is counted down to 0 again, the action of Step 133 is performed.

In addition, if the packet sequence number of the network packet received by the receiving end is smaller than the transmission sequence number, as shown in Step 190, it is determined whether or not to transmit the network packet according to the requirement of the receiving end. For example, if the receiving end does not require a strictly-ordered transmission, the network packet is directly transmitted. However, if the receiving end requires the strictly-ordered transmission, the network packet is dropped.

It should be noted that in the above embodiments, whenever a network packet in the buffer queue is transmitted, if the buffer queue has network packets that have not been transmitted, the receiving end restarts the countdown of the waiting time. In this way, the time that some network packets stay in the buffer queue may exceed the waiting time when the network packets are initially added to the queue.

For example, if the current transmission sequence number is 12, the receiving end starts to count down the waiting time when adding the network packet with the packet sequence number of 13 to the buffer queue (i.e., the buffer queue is empty before the network packet with the packet sequence number of 13 is added to the buffer queue). Then, the network packets with the packet sequence numbers of 14, 15, 17 are added to the buffer queue successively. After a certain time period, when the waiting time is counted down to 0, the network packets with the packet sequence numbers of 13, 14, 15 are transmitted together. At this time, since the buffer queue still has a network packet (i.e., the network packet with the packet sequence number of 17) that has not been transmitted, the receiving end restarts the countdown of the waiting time. If the receiving end does not receive the network packet with the packet sequence number of 12 before the waiting time is counted down to 0 again, the network packet with the packet sequence number 17 will not be transmitted by the receiving end until the waiting time is counted down to 0 again. That is to say, the time that the network packet with the packet sequence number 17 stays in the buffer queue exceeds the original waiting time.

Figure 3:
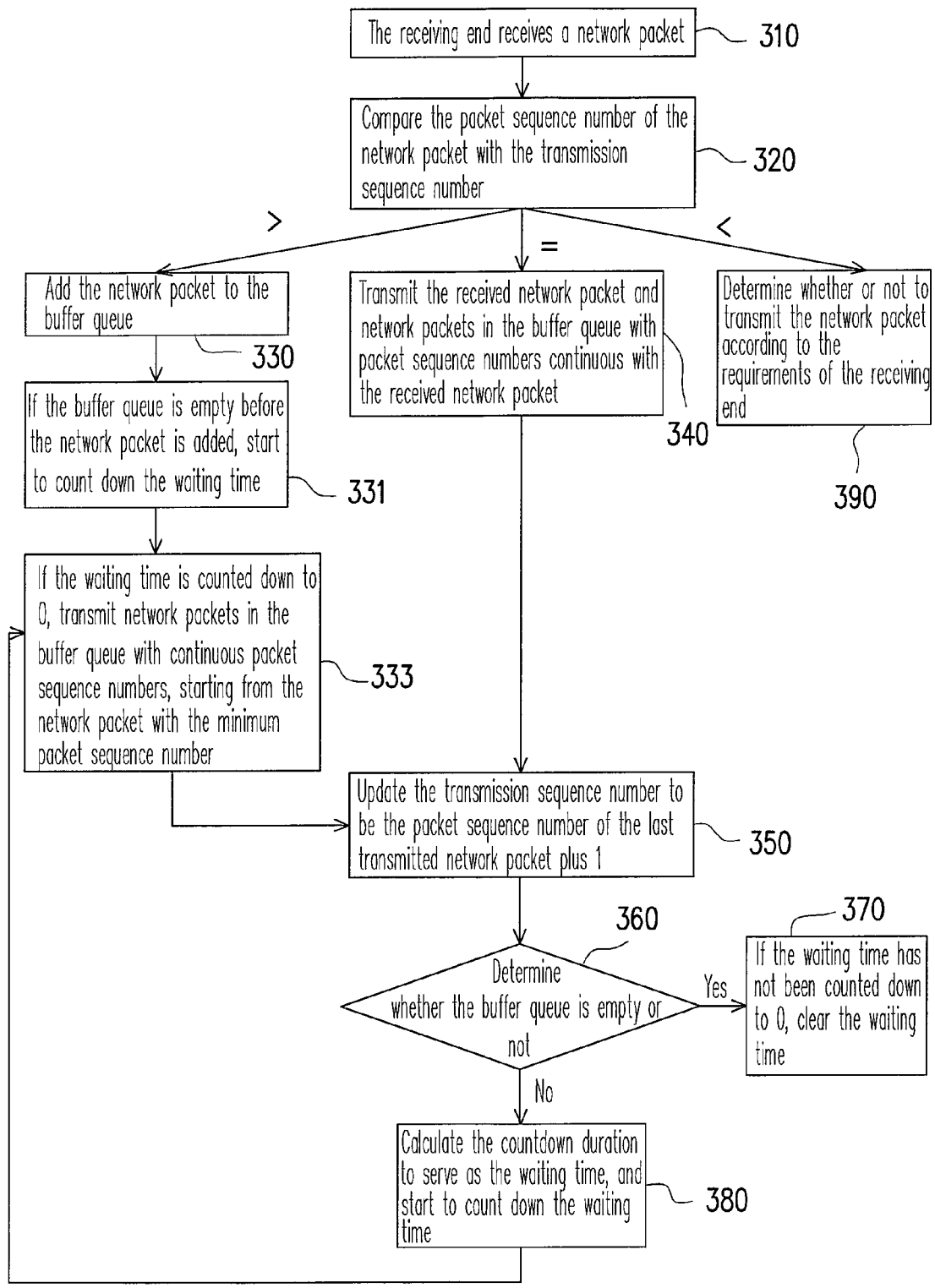
FIG. 3 is a flow chart of a method for transmitting network packets according to another preferred embodiment of the present invention.

Accordingly, whenever a network packet in the buffer queue is transmitted, if the waiting time can be continuously counted down instead of restarting the countdown of the waiting time, the above circumstance can be avoided. FIG. 3 is a flow chart of a method for transmitting network packets according to another preferred embodiment of the present invention. In this embodiment, the network packets received by the receiving end can be processed by the method similar to that of FIG. 1, so the details will not be described herein again. The difference only lies in that whenever the receiving end transmits any network packet in the buffer queue, it is determined whether the buffer queue is cleared or not in Step 360. If the buffer queue still has some network packets that have not been transmitted, as shown in Step 380, the receiving end calculates a countdown duration to serve as a new waiting time, and counts down the updated waiting time.

In this embodiment, the time at which each network packet is added to the buffer queue is recorded. Thus, the method for calculating the countdown duration includes taking the sum of the time when the first network packet is added to the current buffer queue and the waiting time since the first network packet is added as a transmitting time, and taking a difference between the transmitting time and the current time as a countdown duration.

In the above embodiment, all network packets are corresponding to the same countdown of the same waiting time no matter they reach the receiving end through which tunnel (i.e., the network packets in the buffer queue share the same waiting time). However, each tunnel has a different network status, compared with the network packet reaching the receiving end through the tunnel with a lower transmission speed, the network packet reaching the receiving end through the tunnel with a higher transmission speed must have a relatively longer waiting time, thus effectively reflecting the network status and improving the transmission efficiency. Based on the above reasons, in the following embodiment, the waiting time to be counted down for each network packet added to the buffer queue varies according to the tunnel through which the network packet is transmitted.

Figure 4:
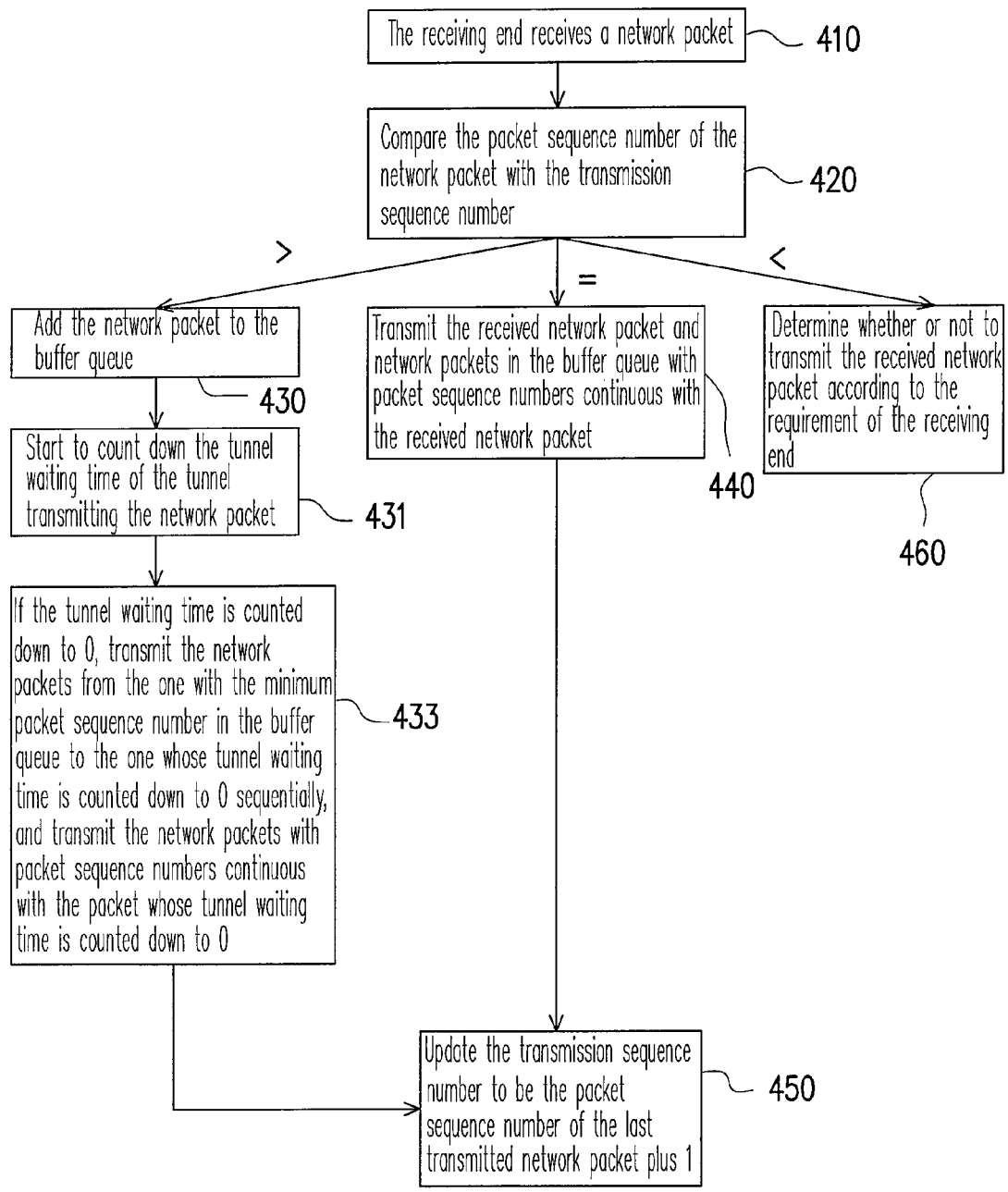
FIG. 4 is a flow chart of a method for transmitting network packets according to still another preferred embodiment of the present invention.

FIG. 4 is a flow chart of a method for transmitting network packets according to a preferred embodiment of the present invention. Referring to FIG. 4, in Step 410, the receiving end receives a network packet transmitted through a tunnel in a tunnel group. Next, in Step 420, the packet sequence number of the network packet is compared with the transmission sequence number.

If the packet sequence number of the network packet is larger than the transmission sequence number, in Step 430, the receiving end adds the network packet to the buffer queue. Then, in Step 431, the tunnel waiting time of the tunnel transmitting the network packet is taken as a corresponding waiting time, and starts to be counted down. That is to say, each network packet added to the buffer queue has its own corresponding waiting time to be counted down (i.e., the tunnel waiting time).

In this embodiment, the method for calculating the tunnel waiting time of each tunnel by the receiving end includes, for example, first calculating the delay time $Lat_i$ and the delay time variation $Var_i$ of each tunnel, in which the positive integer i is the tunnel number corresponding to the delay time variation. The method for calculating the delay time and the delay time variation of the tunnel are similar to those mentioned in the above embodiment, and the details will not be described herein again. Then, the receiving end calculates the maximum value of all the delay times $Lat_{max}=MAX(Lat_1, Lat_2, \ldots, Lat_k)$, and the maximum value of all the delay time variations $Var_{max}=MAX(Var_1, Var_2, \ldots, Var_k)$, where k is the maximum tunnel number. Finally, the corresponding tunnel waiting time $Tun\_wtime_i=(Lat_{max}-Lat_i)+Var_{max}$ of each tunnel is calculated.

Then, in Step 433, if the tunnel waiting time of any packet is counted down to 0, all the network packets from the network packet with the minimum packet sequence number in the buffer queue to the network packet whose tunnel waiting time is counted down to 0, and all the network packets with packet sequence numbers continuous with the one whose tunnel waiting time is counted down to 0 are transmitted sequentially. Finally, as shown in Step 450, the packet sequence number of the last transmitted network packets is added by 1 and then taken as a new transmission sequence number.

For example, if there are nine network packets with packet sequence numbers of 5, 6, 7, 11, 12, 13, 15, 16, 17 in the buffer queue, when the tunnel waiting time of the network packet with the packet sequence number of 16 is counted down to 0, as shown in Step 433, the receiving end transmits all the network packets from the network packet with the minimum packet sequence number to the network packet whose tunnel waiting time is counted down to 0 (i.e., the network packets with packet sequence numbers of 5, 6, 7, 11, 12, 13, 15, 16), and transmits all the network packets with packet sequence numbers continuous with the network packet whose tunnel waiting time is counted down to 0 in the buffer queue (i.e., the network packet with the packet sequence number of 17). Finally, in Step 450, the transmission sequence number is updated to 18.

Return to Step 420. If the receiving end determines that the packet sequence number is equal to the transmission sequence number, as shown in Step 440, the receiving end transmits the received network packet and all network packets in the buffer queue with packet sequence numbers continuous with the received network packet.

If the receiving end determines that the packet sequence number is smaller than the transmission sequence number, in Step 460, it determines whether or not to transmit the network packet according to the requirement of the receiving end. For example, if the receiving end does not require a strictly-ordered transmission, the network packet is directly transmitted. However, if the receiving end requires the strictly-ordered transmission, the network packet is dropped.

This embodiment differs from the above embodiment in that each network packet in the buffer queue counts down its own corresponding waiting time in this embodiment. Therefore, whenever a network packet in the buffer queue is transmitted, the receiving end only needs to update the transmission sequence number, without restarting the countdown of the waiting time.

It should be mentioned that in the above embodiment, the network packet transmitted by the receiving end can be, for example, transmitted to the application executed by the receiving end, or transmitted to other network equipments, which is not limited herein.

To sum up, the method for transmitting network packets according to the present invention at least has the following advantages.

1. A buffer queue is set at the receiving end, such that the reordered network packets are sorted and then transmitted, thus avoiding retransmitting the network packet which is mistakenly determined to be lost due to receiving the reordered network packets, thereby improving the network transmission efficiency.

2. The time that the network packet stays in the buffer queue is automatically set according to different network status of the tunnel group, thus effectively reflecting the network status, such that the waiting time of the network packet in the queue is more correct and flexible.

3. The method for transmitting network packets according to the present invention can be applied to a plurality of tunnel groups in the same manner, thereby providing higher network transmission quality.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

Figure 5:
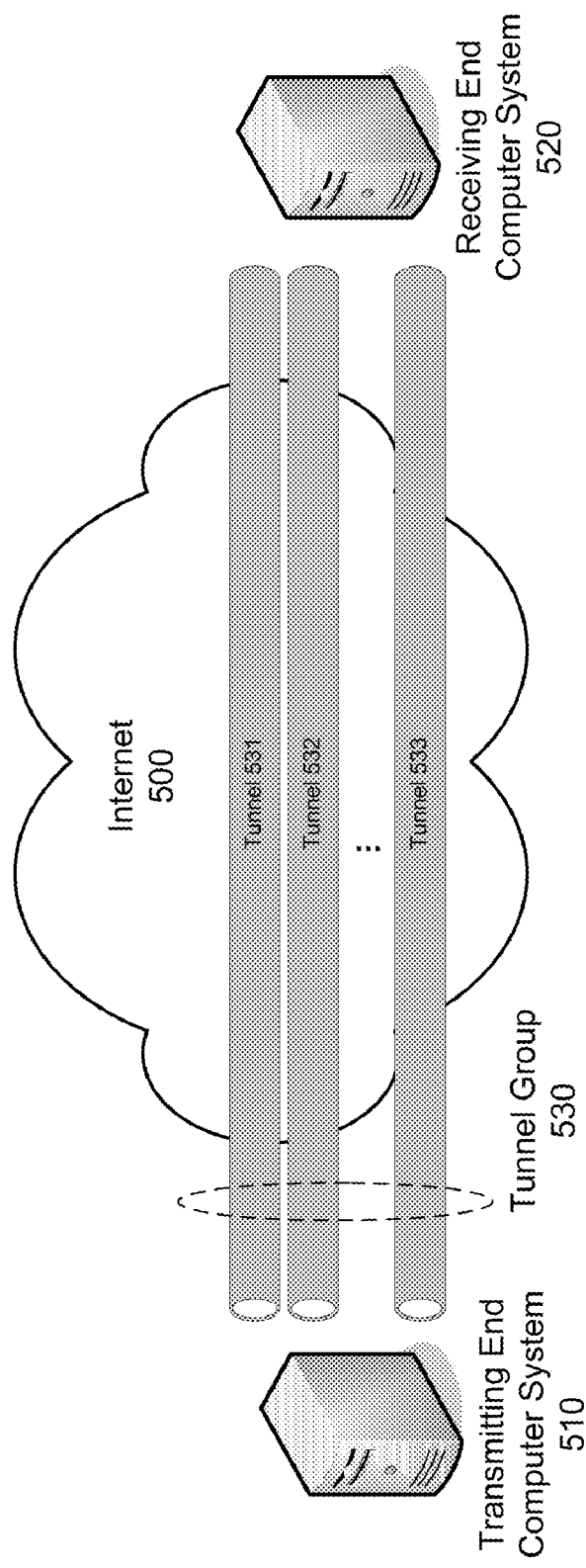
FIG. 5 conceptually illustrates a network environment in which embodiments of the present invention may be implemented.

FIG. 5 conceptually illustrates a network environment in which embodiments of the present invention may be implemented. According to the present example, a transmitting end computer system 510 may transmit network packets to a receiving end computer system 520 via the Internet 500 through a tunnel group 530 comprising one or more tunnels (e.g., tunnel 531, tunnel 531 and tunnel 532). In other network configurations, additional computer systems may participate in the receipt and/or transmission of network packets and additional tunnel groups may be utilized.

What is claimed is:

1. A method for transmitting network packets, suitable for a tunnel group having at least one tunnel, comprising:
   receiving, at a receiving end computer system, a current network packet, the receiving end computer system has stored therein a transmission sequence number and a buffer queue;
   comparing, by the receiving end computer system, a packet sequence number in the current network packet with the transmission sequence number;
   if the packet sequence number is larger than the transmission sequence number, the receiving end computer system, adding the current network packet to the buffer queue, and correspondingly counting down a waiting time;
   if the packet sequence number is equal to the transmission sequence number, the receiving end computer system transmitting the current network packet and network packets in the buffer queue with sequence numbers continuous with the current network packet;
   if the packet sequence number is smaller than the transmission sequence number, the receiving end computer system determining whether or not to transmit the current network packet according to a requirement of the receiving end computer system; and
   when the waiting time expires, the receiving end computer system transmitting network packets in the buffer queue with continuous sequence numbers, starting from the network packet with the minimum packet sequence number in the buffer queue.

2. The method for transmitting network packets as claimed in claim 1, further comprising:
   whenever a network packet in the buffer queue is transmitted, the receiving end computer system updating the transmission sequence number to be the packet sequence number of the last transmitted network packet plus 1.

3. The method for transmitting network packets as claimed in claim 1, further comprising:
   whenever a network packet in the buffer queue is transmitted, if the buffer queue is empty, the receiving end computer system clearing the waiting time.

4. The method for transmitting network packets as claimed in claim 1, further comprising:
   whenever a network packet in the buffer queue is transmitted, if the buffer queue is not empty, the receiving end computer system restarting the countdown of the waiting time.

5. The method for transmitting network packets as claimed in claim 1, further comprising:
   whenever a network packet in the buffer queue is transmitted, if the buffer queue is not empty, the receiving end computer system calculating a countdown duration, and starting to count down the countdown duration.

6. The method for transmitting network packets as claimed in claim 5, wherein the step of "calculating the countdown duration" comprises:
   the receiving end computer system taking a sum of the time when the first network packet is added to the buffer queue and the waiting time when the first network packet is added as a transmitting time; and
   the receiving end computer system taking a difference between the transmitting time and a current time as the countdown duration.

7. The method for transmitting network packets as claimed in claim 1, wherein the step of "if the packet sequence number is smaller than the transmission sequence number, the receiving end computer system determining whether or not to transmit the current network packet according to a requirement of the receiving end" comprises:

if the receiving end computer system does not require strictly-ordered transmission, the receiving end computer system transmitting the current network packet; and if the receiving end computer system requires strictly-ordered transmission, the receiving end computer system dropping the current network packet.

8. The method for transmitting network packets as claimed in claim 1, further comprising:

calculating, by the receiving end computer system, a delay time $Lat_i$ of each tunnel of the tunnel group according to a time difference for a network packet transmitted from a transmitting end computer system to the receiving end computer system via each said tunnel respectively, wherein the positive integer i is a tunnel number corresponding to the delay time;

calculating, by the receiving end computer system, a delay time variation $Var_i$ of each said tunnel according to a difference between the delay time and the previously-calculated delay time of each said tunnel; and calculating, by the receiving end computer system, the waiting time according to the delay time and the delay time variation.

9. The method for transmitting network packets as claimed in claim 8, wherein the time difference is a relative time difference or an absolute time difference, and the step of "calculating, by the receiving end computer system, a delay time $Lat_i$ of each said tunnel according to a time difference for a network packet transmitted from a transmitting end computer system to the receiving end computer system via each said tunnel respectively" comprises:

calculating, by the receiving end computer system, the delay time $Lat_i = Lat_{i_{old}} * N + Delta\_t_i/(N+1)$, where the $Lat_{i_{old}}$ is the previously-calculated delay time of the tunnel, $Delta\_t_i$ is the time difference, and N is an integer greater than 0.

10. The method for transmitting network packets as claimed in claim 8, wherein the step of "calculating, by the receiving end computer system, a delay time variation $Var_i$ of each said tunnel according to a difference between the delay time and the previously-calculated delay time of each said tunnel" comprises:

calculating, by the receiving end computer system, the delay time variation $Var_i = (Var_{i_{old}} * M + |Delta\_t_i - Lat_{i_{old}}|)/(M+1)$, where $Var_{i_{old}}$ is the previously-calculated delay time variation of the tunnel, $Delta\_t_i$ is the time difference, $Lat_{i_{old}}$ is the previously-calculated delay time of the tunnel, and M is an integer greater than 0.

11. The method for transmitting network packets as claimed in claim 8, wherein the step of "if the packet sequence number is larger than the transmission sequence number, adding, by the receiving end computer system, the current network packet to the buffer queue, and correspondingly counting down a waiting time" further comprises:

if the buffer queue is empty before the current network packet is added to the buffer queue, starting, by the receiving end computer system, to count down the waiting time.

12. The method for transmitting network packets as claimed in claim 11, wherein the step of "calculating, by the receiving end computer system, the waiting time according to the delay time and the delay time variation" further comprises:

calculating, by the receiving end computer system, a maximum value of the delay time $Lat_{max} = MAX(Lat_1, Lat_2, \ldots, Lat_k)$, where k is a maximum tunnel number;

calculating, by the receiving end computer system, a maximum value of the delay time variation $Var_{max} = MAX(Var_1, Var_2, \ldots, Var_k)$;

calculating, by the receiving end computer system, a maximum difference of the delay times $Lat\_Diff_{max} = MAX((Lat_{max} - Lat_1), (Lat_2), \ldots, (Lat_{max} - Lat_k))$; and calculating, by the receiving end computer system, the waiting time $= Lat\_Diff_{max} + Var_{max}$.

13. The method for transmitting network packets as claimed in claim 8, wherein the waiting time comprises a tunnel waiting time $Tun\_wtime_i$ of each said tunnel, and the step of "if the packet sequence number is larger than the transmission sequence number, adding, by the receiving end computer system, the current network packet to the buffer queue, and correspondingly counting down the waiting time" further comprises:

before the current network packet is added, starting, by the receiving end computer system, to count down the tunnel waiting time of the tunnel transmitting the current network packet.

14. The method for transmitting network packets as claimed in claim 13, further comprising:

calculating, by the receiving end computer system, a maximum value of the delay time $Lat_{max} = MAX(Lat_1, Lat_2, \ldots, Lat_k)$, where k is the maximum tunnel number;

calculating, by the receiving end computer system, a maximum value of the delay time variation $Var_{max} = MAX(Var_1, Var_2, \ldots, Var_k)$; and calculating, by the receiving end computer system, the tunnel waiting time $Tun\_wtime_i = (Lat_{max} - Lat_i) + Var_{max}$.

15. The method for transmitting network packets as claimed in claim 13, wherein the step of "transmitting, by the receiving end computer system, network packets in the buffer queue with continuous packet sequence numbers, starting from the network packet with the minimum packet sequence number" further comprises:

sequentially transmitting, by the receiving end computer system, network packets in the buffer queue from the network packet with the minimum packet sequence number to the network packet whose tunnel waiting time has expired, and the network packets having packet sequence numbers continuous with the network packet whose tunnel waiting time has expired.

\* \* \* \* \*

UNITED STATES PATENT AND TRADEMARK OFFICE
CERTIFICATE OF CORRECTION

PATENT NO. : 7,801,145 B2
APPLICATION NO. : 11/775594
DATED : September 21, 2010
INVENTOR(S) : Xia et al.

It is certified that error appears in the above-identified patent and that said Letters Patent is hereby corrected as shown below:

Column 5
Line 10, change "change" to --changes--

Column 6
Line 11, change "$Lat_i$ old" to --$Lat_{i\_old}$--
Line 21, change "$(Lat_{max}–Lat_k)))$" to --$(Lat_{max}–Lat_k))$--

Column 8
Line 3, change "matter they" to --matter if they--

Column 9
Line 30, change "equipments" to --equipment--

Column 12
Line 18, change "$(Lat_2)$" to --$(Lat_{max}–Lat_2)$--

Signed and Sealed this
Thirteenth Day of December, 2011

David J. Kappos
*Director of the United States Patent and Trademark Office*